US009182065B2

(12) United States Patent
Bichler

(10) Patent No.: US 9,182,065 B2
(45) Date of Patent: Nov. 10, 2015

(54) CALIBRATION HOSE

(75) Inventor: Andreas Bichler, Tirol (AT)

(73) Assignee: TRELLEBORG PIPE SEALS DUISBURG GMBH (DE)

( * ) Notice: Subject to any disclaimer, the term of this patent is extended or adjusted under 35 U.S.C. 154(b) by 27 days.

(21) Appl. No.: 14/113,949

(22) PCT Filed: May 3, 2012

(86) PCT No.: PCT/EP2012/058131
§ 371 (c)(1),
(2), (4) Date: Oct. 25, 2013

(87) PCT Pub. No.: WO2012/152651
PCT Pub. Date: Nov. 15, 2012

(65) Prior Publication Data
US 2014/0048151 A1    Feb. 20, 2014

Related U.S. Application Data

(60) Provisional application No. 61/483,084, filed on May 6, 2011.

(30) Foreign Application Priority Data

May 6, 2011    (DE) .......................... 10 2011 075 403

(51) Int. Cl.
*F16L 55/16*    (2006.01)
*F16L 55/179*    (2006.01)
*F16L 55/165*    (2006.01)

(52) U.S. Cl.
CPC ........... *F16L 55/179* (2013.01); *F16L 55/1654* (2013.01); *Y10T 137/598* (2015.04)

(58) Field of Classification Search
USPC ......... 138/98, 97; 264/269, 267, 516; 156/94, 156/287, 294, 574
See application file for complete search history.

(56) References Cited

U.S. PATENT DOCUMENTS

| 5,454,401 | A | * | 10/1995 | Kamiyama et al. | ............. | 138/98 |
| 5,598,873 | A | | 2/1997 | Kamiyama et al. | | |
| 5,927,341 | A | * | 7/1999 | Taylor | ............................ | 138/98 |
| 5,950,682 | A | * | 9/1999 | Kiest, Jr. | ......................... | 138/98 |

(Continued)

FOREIGN PATENT DOCUMENTS

| DE | 102008055943 A1 | 12/2010 |
| EP | 0518521 A2 | 12/1992 |

(Continued)

OTHER PUBLICATIONS

International Search Report and Written Opinion, Oct. 17, 2012, for PCT/EP2012/058131.

*Primary Examiner* — Patrick F Brinson
(74) *Attorney, Agent, or Firm* — Dickinson Wright PLLC

(57) ABSTRACT

A calibration hose (10) for use in a device for rehabilitating pipelines (14, 16), having a main pipe calibration hose (18) and a lateral pipe calibration hose (20), the main pipe calibration hose (18) having a connecting region (90), the lateral pipe calibration hose (20) being connected in its first end region (26) to the connecting region (90) of the main pipe calibration hose (18), and the lateral pipe calibration hose (20) being closed in its second end region (28). In order to permit the air to escape via the calibration hose, the invention proposes that a valve (30) be provided in the second end region (28).

24 Claims, 7 Drawing Sheets

(56) References Cited

U.S. PATENT DOCUMENTS

| | | | |
|---|---|---|---|
| 6,039,079 A * | 3/2000 | Kiest, Jr. | 138/98 |
| 6,994,118 B2 * | 2/2006 | Kiest et al. | 138/98 |
| 7,975,726 B2 * | 7/2011 | Kiest, Jr. | 138/98 |
| 2005/0133105 A1 | 6/2005 | Criffo' | |
| 2005/0200037 A1 * | 9/2005 | Sanders | 264/36.17 |
| 2011/0036423 A1 | 2/2011 | Yi et al. | |

FOREIGN PATENT DOCUMENTS

| | | |
|---|---|---|
| EP | 0640464 A2 | 3/1995 |
| EP | 065006 A1 | 4/1995 |
| GB | 1406736 A | 9/1975 |

* cited by examiner

CALIBRATION HOSE

CROSS REFERENCE TO RELATED APPLICATIONS

The present application is a 35 U.S.C. Section 371 national stage filing of International Patent Application No. PCT/EP2012/058131, filed 3 May 2012, and through which priority is claimed to German patent application DE 10 2011 075 403.2, filed 6 May 2011, and U.S. Provisional Application Ser. No. 61/483,084, filed 6 May 2011, the disclosures of which applications are incorporated herein by reference in their entireties.

The present invention relates to a calibration hose for use in a device for rehabilitating pipelines, having a main pipe calibration hose and a lateral pipe calibration hose, the main pipe calibration hose having a connecting region, the lateral pipe calibration hose being connected in its first end region to the connecting region of the main pipe calibration hose, and the lateral pipe calibration hose being closed in its second end region.

Calibration hoses of this type are used for rehabilitating pipelines, in particular for rehabilitating the junction area of house pipe connections. To this end, the calibration hose has a main pipe calibration hose and a lateral pipe calibration hose, which is designed to be expansible and inflatable. In the inflated state, the calibration hose has approximately the shape and size of the pipe section to be rehabilitated. Furthermore, the lateral pipe calibration hose is arranged at an angle to the main pipe calibration hose, this angle corresponding to the angle between the house connecting pipe and a main pipe. In order to rehabilitate the junction area, the calibration hose is pushed onto a device for rehabilitating the pipelines, which device is also designated a packer. Here, the calibration hose is in each case fixed to the packer at each end by means of clamping collars, so that an airtight connection is produced. Furthermore, a lining element impregnated with resin is provided. The lining element can also be designated a liner. The lining element preferably comprises a layer of resin-absorbing material, in particular a nonwoven or fibrous material. After that, the lateral pipe calibration hose, together with the liner, is slipped into the main pipe calibration hose. To this end, the free end of the lateral pipe calibration hose is provided with a cord. At the same time, the air in the main pipe calibration hose and in the lateral pipe calibration hose is extracted. The packer is then conveyed to the junction area to be rehabilitated. Following the positioning, the main pipe calibration hose is inflated and the lateral pipe calibration hose with the liner is inverted into the house connection, which means slipped in. Slipping in is carried out with the aid of a cord or fibreglass rod fitted to the outside on the free end of the lateral pipe calibration hose. As a result of the inversion, the liner is pressed against the point to be rehabilitated. Following the curing of the liner, the air is let out of the calibration hose and the device is taken out of the main pipe. The cured liner rests on the inner wall of the pipeline with a form and force fit.

US 2009/0194184 A1 discloses a calibration hose which has a main pipe calibration hose and a lateral pipe calibration hose. In order to invert the calibration hose, the free end of the lateral pipe calibration hose is closed with the aid of an eyelet projecting into the interior of the calibration hose. Furthermore, U.S. Pat. No. 5,915,419 A discloses a packer in which compressed air and power are fed in at one end via two connections and there are two outlets at the other end. The disadvantage here is that a large number of connections are required on the packer for the control of the air pressure within the calibration hose.

The invention is therefore based on the object of specifying a calibration hose which permits control of the fluid pressure within the calibration hose.

In order to achieve the object, in a calibration hose of the type mentioned at the beginning, it is proposed that a valve be provided in the second end region.

The calibration hose according to the invention is distinguished by the fact that a valve is arranged in its second end region and is used to control the pressure within the calibration hose. The closed end of the lateral pipe calibration hose is preferably made of the same material as the lateral pipe calibration hose per se. Furthermore, the second end region and the lateral pipe calibration hose can be formed in one piece or from several pieces of material.

In the calibration hose according to the invention, the valve is advantageously an outlet valve, in particular a pressure relief valve, so that, in the event of an excessive pressure, air can be let out of the calibration hose. In the event of an excessive pressure, once the pressure required to press on the lining element is reached again following the opening of the valve, then the valve closes again. Consequently, a calibration hose is created which means that it is no longer necessary to check the maximum pressure. Furthermore, the valve is distinguished by its reliability and by the low manufacturing costs.

In a further advantageous refinement, at least one pulling means connecting device is fitted to the valve. Advantageously, a first end of the valve and a second end of the valve are each provided with a pulling means connecting device. With the aid of this pulling means connecting device, it is possible to slip the lateral pipe calibration hose into the house connecting pipe. To this end, a cord or a fibreglass rod is fitted to the pulling means connecting device. By means of pulling on the cord or the fibreglass rod, the lateral pipe calibration hose is slipped into the house connecting pipe. Furthermore, a pulling means connecting device arranged on the inside of the lateral pipe calibration hose can be used to slip the lateral pipe calibration hose into the main pipe calibration hose. To this end, a cord is fitted to the pulling means connecting device projecting inwards.

Advantageously, the first end of the valve and/or the second end of the valve are each provided with a thread, and at least one of the threads engages with an annular nut as a pulling means connecting device. Thus, a compact unit comprising valve and pulling means connecting device(s) is made possible, which can easily be integrated into the closed end of the lateral pipe calibration hose. Furthermore, as desired and as needed, one pulling means connecting device or two pulling means connecting devices can be fitted.

The second end region is advantageously closed by a cover, the cover being connected to the second end region of the lateral pipe calibration hose in a material-locking manner and/or by sewing, an aperture being introduced into the cover, into which the valve is inserted. Since the second end region is closed, it is ensured that no air can escape when the calibration hose is inflated. Connecting the valve to the calibration hose via an aperture made in the cover constitutes cost-effective incorporation of the valve into the calibration hose.

In a further advantageous refinement, at least one fabric strip is arranged between the valve and an outer side of the cover and/or between the valve and an inner side of the cover in each case. This fabric strip is preferably a fabric ring. Furthermore, a silicone ring is advantageously arranged between at least one of the fabric strips and the valve. In addition, at least one metallic ring is advantageously arranged between the fabric strip and the silicone ring. The fabric strip ensures reinforcement of the cover in the region of the opening into which the valve is introduced. Furthermore, the silicone ring is used to seal off the region between the opening and the valve. In addition, the valve can advantageously be supported on the metallic ring.

Advantageously, the lateral pipe calibration hose is connected to the connecting region via a detachable connecting device. This makes it possible to replace one of the two hoses easily. Furthermore, depending on the length of the lateral pipe section, a lateral pipe calibration hose having a suitable length can be fitted to the main pipe calibration hose. For example, if the lateral pipe calibration hose is damaged, this can easily be exchanged without the entire calibration hose having to be replaced. Furthermore, if two separate hoses are used, the ability to handle the calibration hose as it is pushed onto the packer and removed from the packer is enhanced. In addition, depending on the nature of the pipes or depending on the angle at which the house connecting pipe projects from the main pipe, an appropriate calibration hose can be assembled. The lateral pipe calibration hose can be connected to the main pipe calibration hose via the detachable connecting device at an angle of about 45° or about 90°.

Advantageously, the detachable connecting device is or comprises a zip fastener or a hook-and-loop fastener. A detachable connecting device in the form of a zip fastener or a hook-and-loop fastener constitutes a detachable connecting device that is cost-effective and simple to handle. In addition, it is also conceivable to bond or to sew the lateral pipe calibration hose to the main pipe calibration hose.

Furthermore, the connecting device can comprise a plurality of connecting units. Here, the first connecting unit can be fixed to the end region of the lateral pipe calibration hose, and the second connecting unit can be fixed to the main pipe calibration hose in the region of the opening. It is also possible for the main pipe calibration hose to be provided with a plurality of connecting units and, as a result, for different lateral pipe calibration hoses to be connected, for example at different angles.

Advantageously, the detachable connecting device comprises a connecting ring connected to the connecting region and a clamping ring, the first end region of the lateral pipe calibration hose being fixed in a force-fitting manner in a recess in the connecting ring by means of the clamping ring. It is also advantageous for the connecting region to be formed as a connector-type calibration hose. The connector-type calibration hose is preferably formed from the same material as the main pipe calibration hose and also preferably formed in one piece with the latter. Alternatively, the connector-type calibration hose can also be a separate part which is connected to the main pipe calibration hose, preferably by means of sewing and/or adhesive bonding. A detachable connecting device in the form of a connecting ring and a clamping ring constitutes a detachable connecting device that is cost-effective and simple to handle. Furthermore, in the event of a defective connecting ring or clamping ring, the defective part can simply be changed. Furthermore, such a detachable connecting device ensures sufficient sealing, so that when pressing on the lining element, a constant contact pressure is made available.

Advantageously, the lateral pipe calibration hose and/or main pipe calibration hose has at least one sealing lip, which at least partly covers the detachable connecting device. In the event of a defective detachable connecting device, the sealing lip ensures that no air can escape, so that the required contact pressure can be maintained despite a defective connecting device. Furthermore, the sealing lip protects the connecting device against damage and/or soiling. Advantageously, the connecting device or at least one of the connecting units is surrounded by an inner and an outer sealing lip.

Also advantageously, the main pipe calibration hose and/or lateral pipe calibration hose comprises at least one reinforcing element, in particular a fabric strip. The fabric strip ensures that, in particular, the main pipe calibration hose is not damaged in the bottom area by rigid or movable elements of the packer.

In a further advantageous refinement, the main pipe calibration hose and/or the lateral pipe calibration hose comprises a fabric layer and at least one plastic coating. As a result of the combination of a fabric layer with a plastic coating, the calibration hose has the properties required for the use for rehabilitating pipelines, comprising adequate water tightness, expansibility and resistance. The fabric is preferably a textile layer. The plastic coating used is preferably silicone.

The invention will be explained in more detail below using exemplary embodiments, which are illustrated schematically in the drawings, in which.

Figure 2:
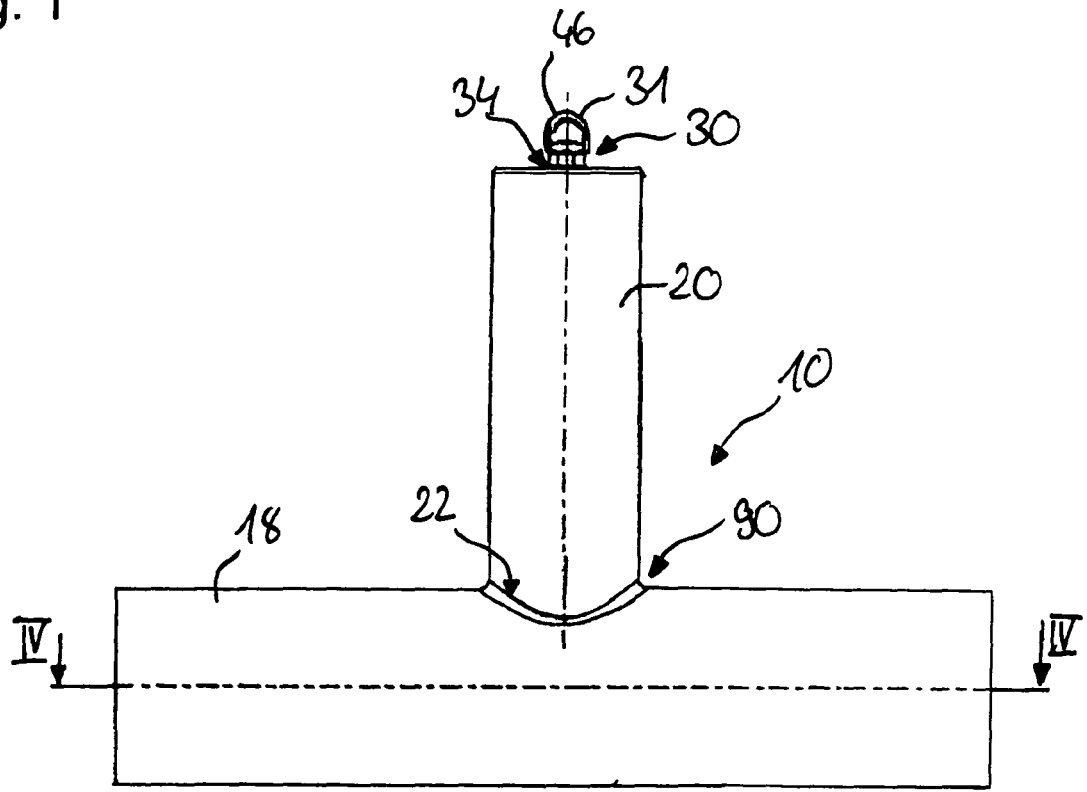
FIG. 2 shows the calibration hose according to the invention according to the first embodiment.
Figure 3:
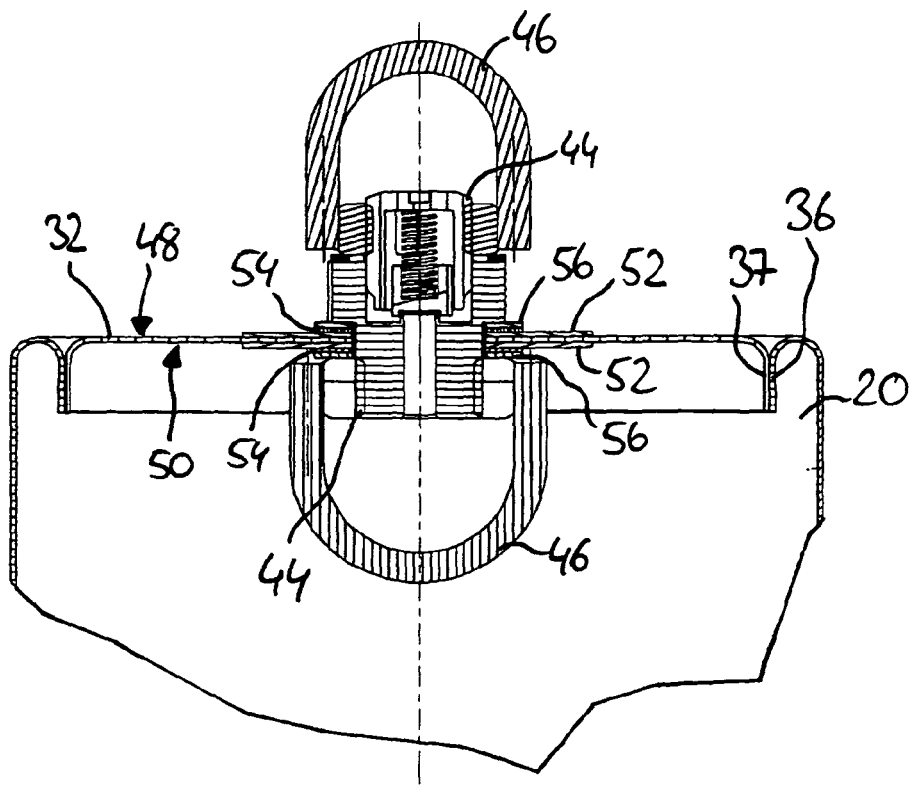
Figure 4:
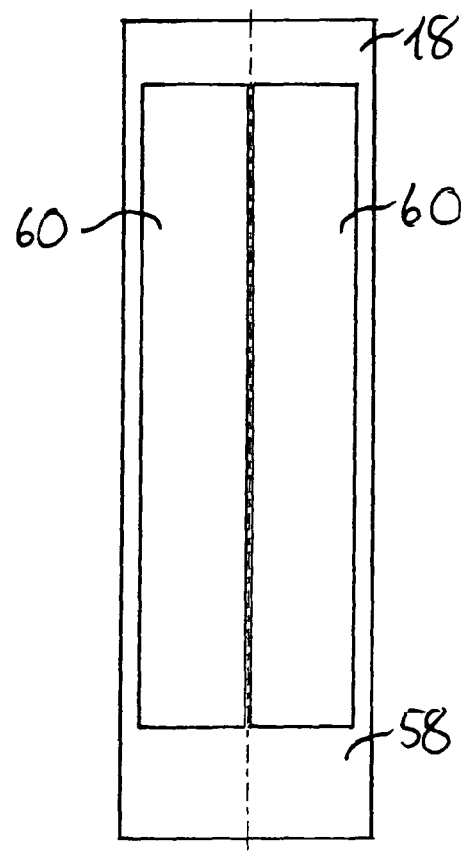
Figure 5:
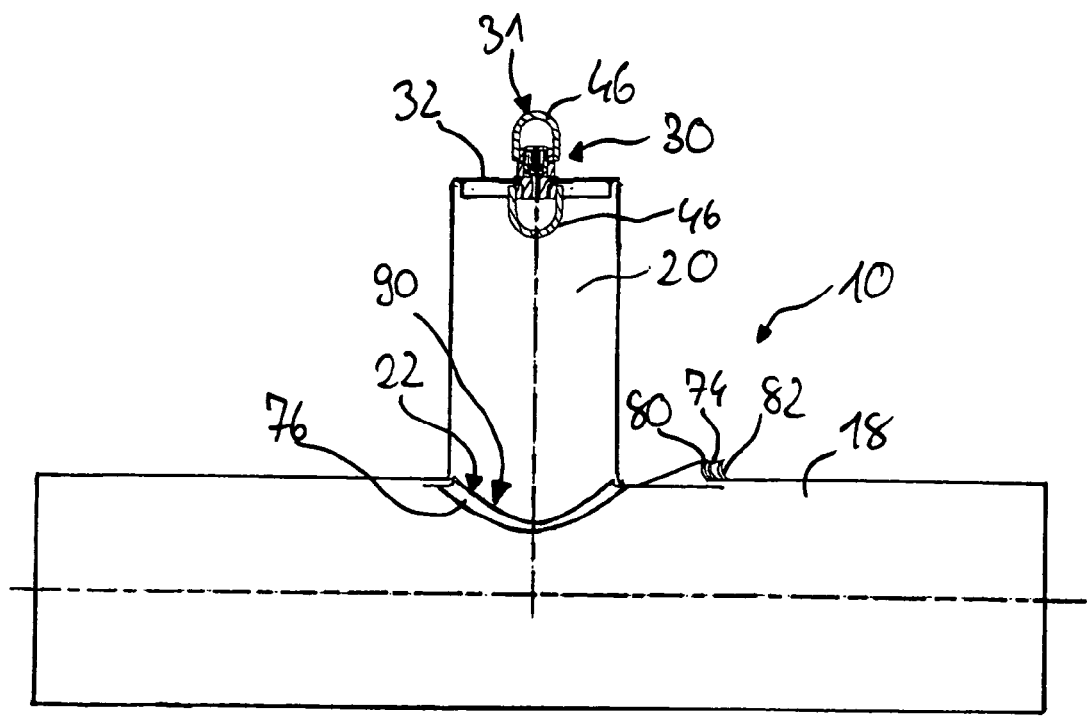
Figure 6:
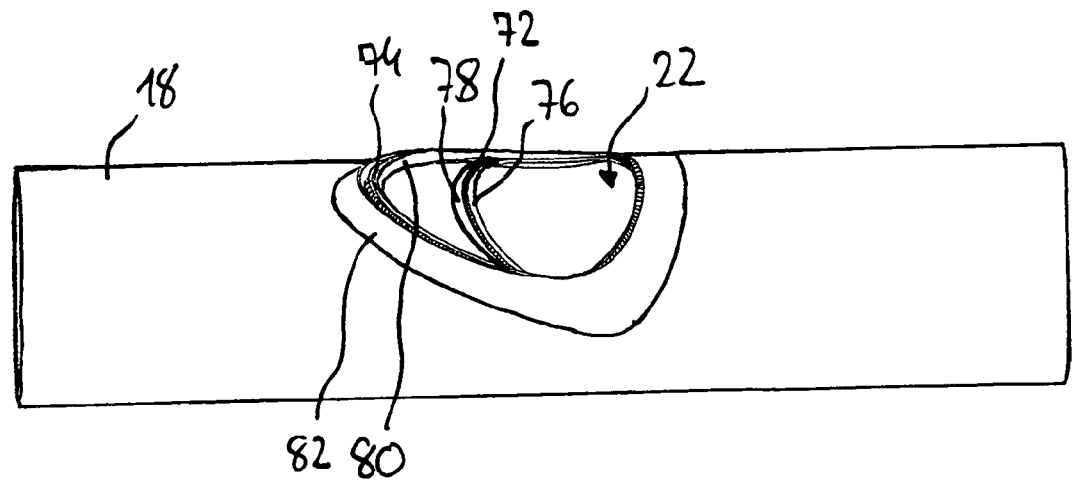
Figure 7:
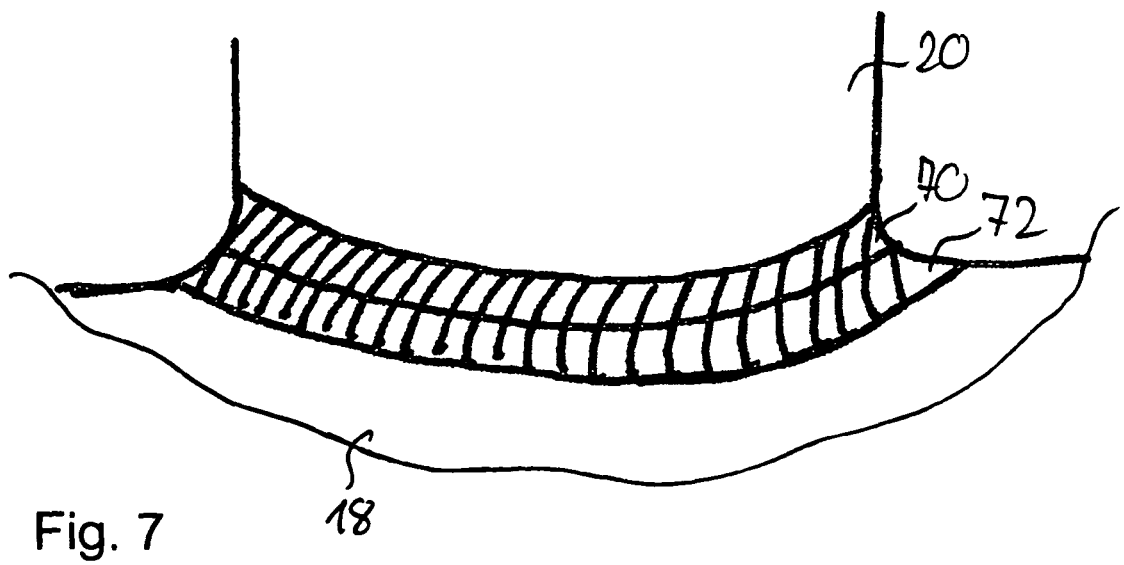
Figure 8:
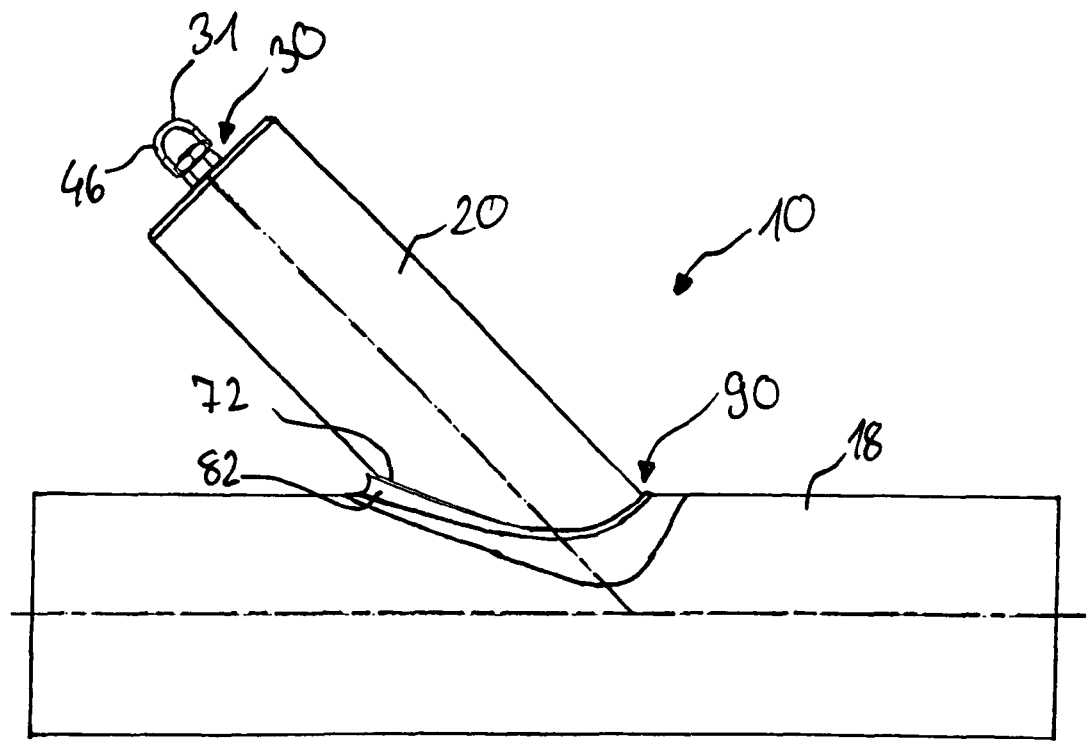
Figure 9:
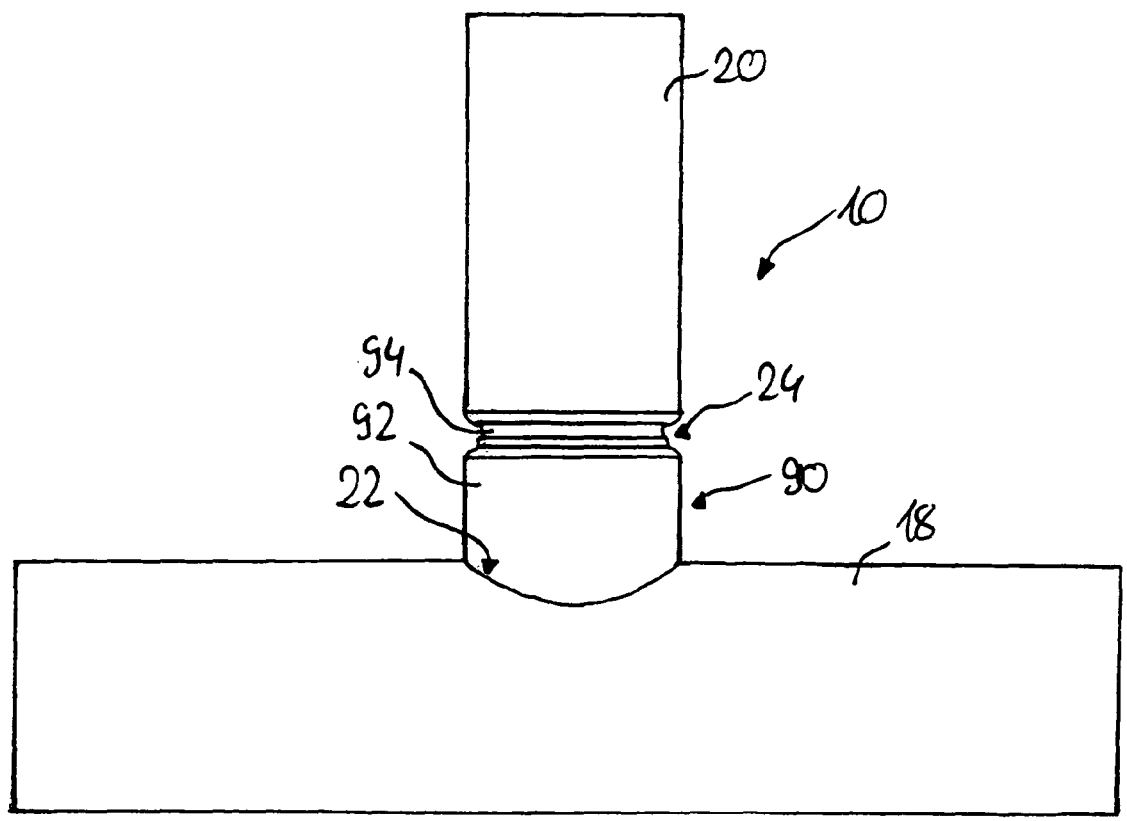
Figure 10:
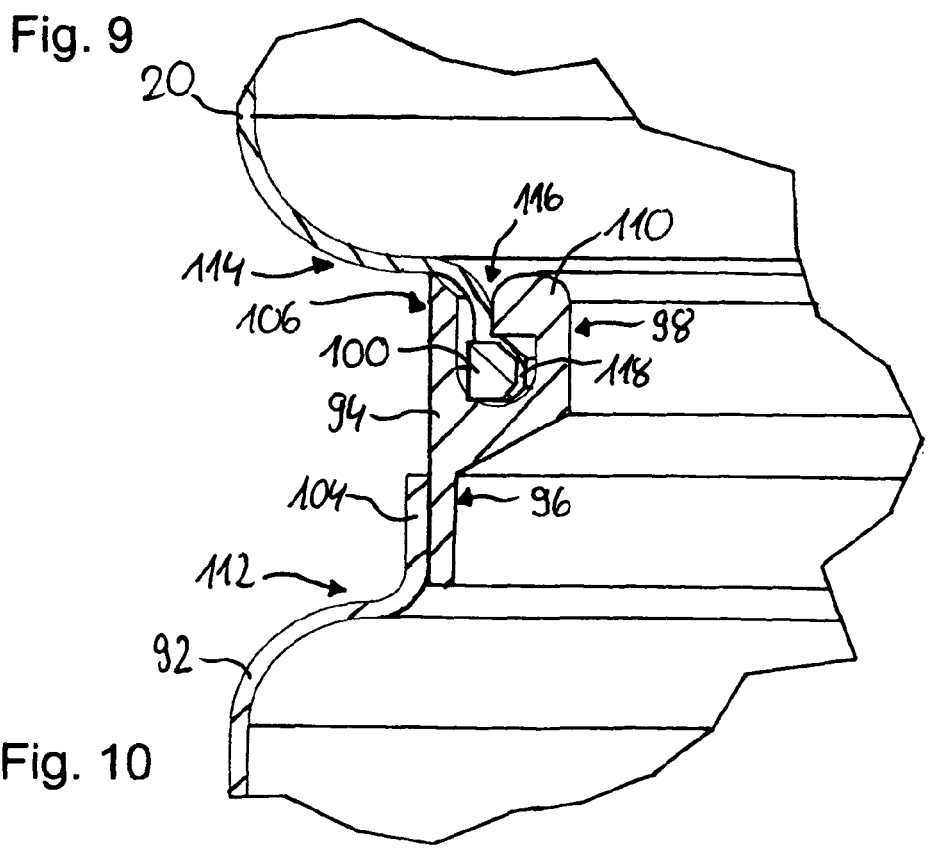
Figure 11:
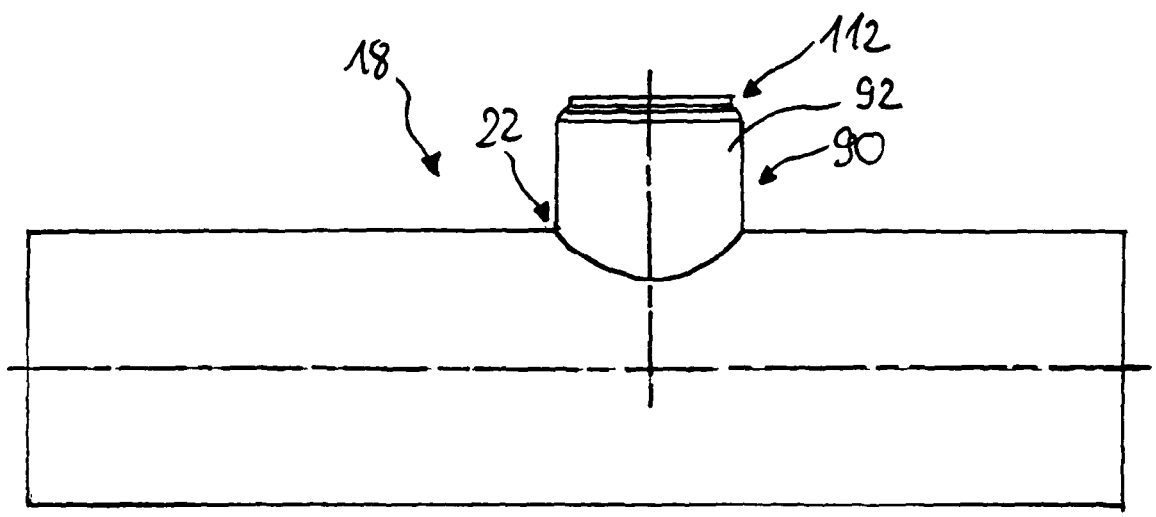
Figure 12:
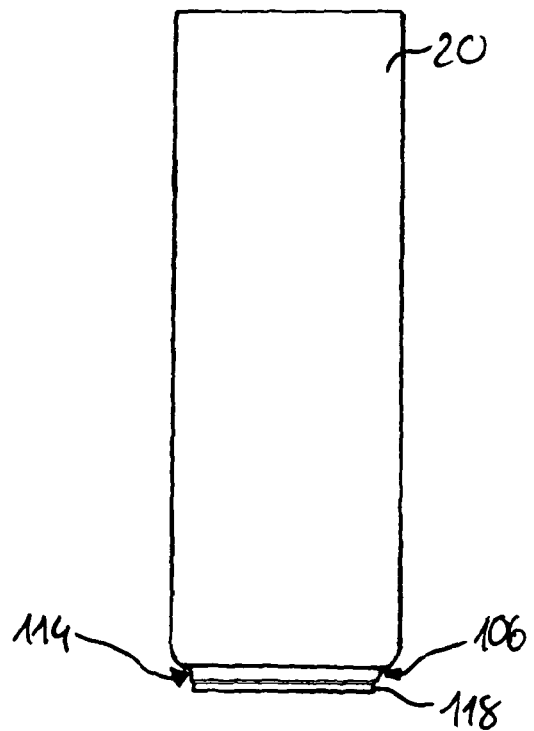
Figure 13:
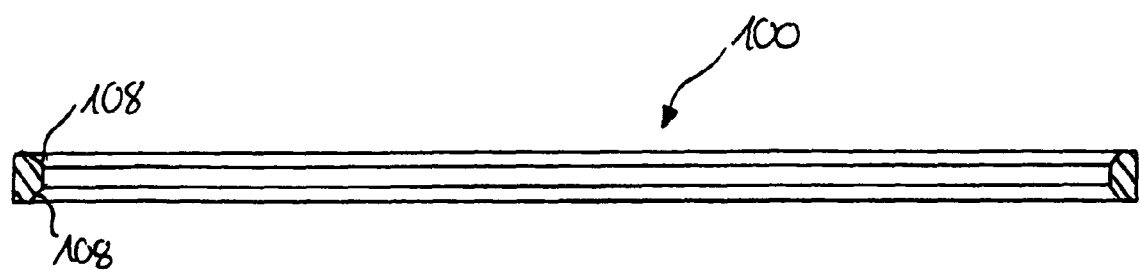

FIG. 3. shows an enlarged detail of a vertical section through the lateral pipe calibration hose;

FIG. 4 shows a horizontal section along the line IV-IV from FIG. 2 through a main pipe calibration hose;

FIG. 5 shows a vertical section through the calibration hose according to the invention according to a second embodiment;

FIG. 6 shows a perspective view of a main pipe calibration hose according to the second embodiment of the calibration hose;

FIG. 7 shows an enlarged illustration of a detachable connecting device;

FIG. 8 shows a calibration hose according to the invention according to a third embodiment;

FIG. 9 shows a calibration hose according to the invention according to a fourth embodiment;

FIG. 10 shows an enlarged detail of a vertical section through the lateral pipe calibration hose and the connector-type calibration hose in the area of the detachable connecting device;

FIG. 11 shows a main pipe calibration hose of the calibration hose according to the invention according to the fourth embodiment;

FIG. 12 shows a lateral pipe calibration hose of the calibration hose according to the invention according to the fourth embodiment;

FIG. 13 shows a vertical section through a clamping ring, and

Figure 14:
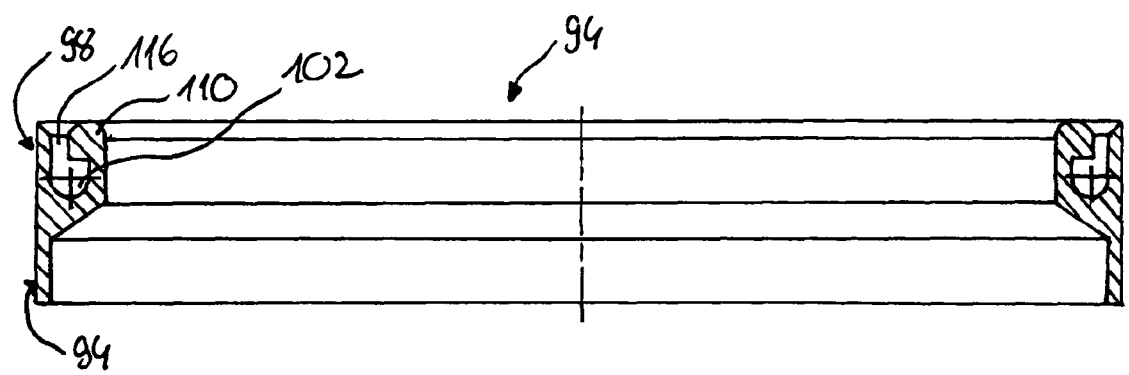

FIG. 14 shows a vertical section through a connecting ring.

Figure 1:
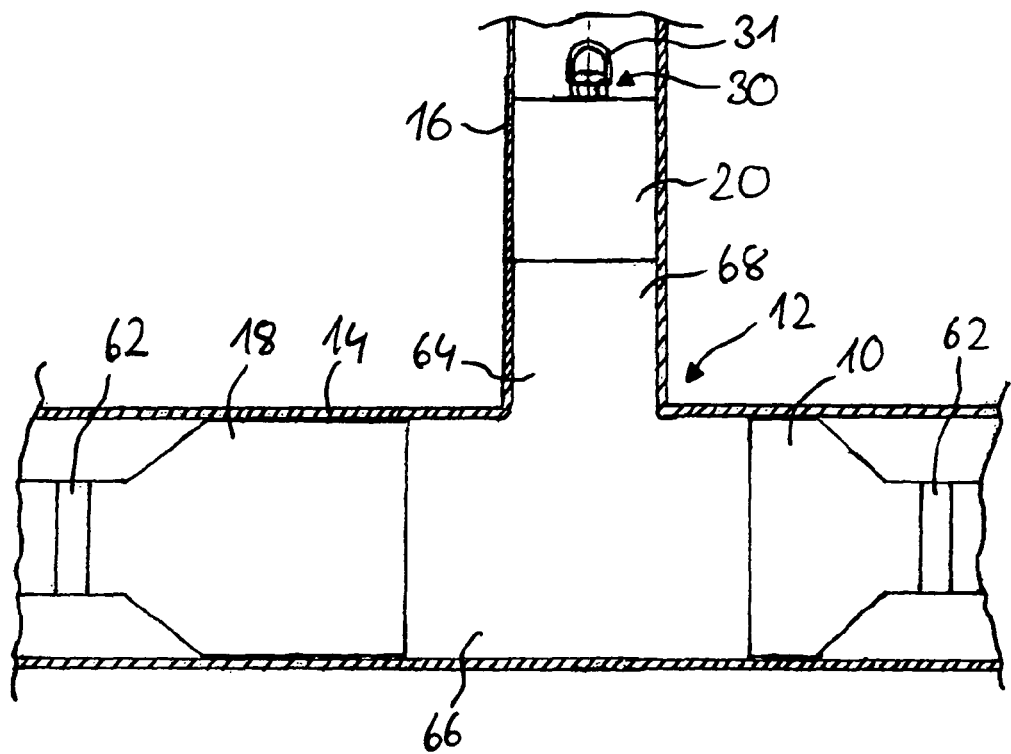
FIG. 1 shows a schematic view of the calibration hose according to the invention according to a first embodiment, having a lining element in the junction area of a main pipe and a house connecting pipe.

FIG. 1 shows a calibration hose 10 for rehabilitating a junction area 12 of a main pipe 14 and of a house connecting pipe 16.

As can be seen in FIGS. 1 and 2, the approximately T-shaped calibration hose 10 has a cylindrical main pipe calibration hose 18 and a cylindrical lateral pipe calibration hose 20. In the inflated state of the calibration hose 10, shown in FIG. 1, the diameter of the main pipe calibration hose 18 corresponds substantially to that of the main pipe 14, and the diameter of the lateral pipe calibration hose 20 corresponds substantially to that of the house connecting pipe 16. The lateral pipe calibration hose is connected to the main pipe calibration hose 18 via a connecting region 90. The connecting region 90 is formed as an opening 22 introduced between the two ends of the main pipe calibration hose 18. In its first end region 26, the lateral pipe calibration hose is connected in a material-locking manner and/or sewn to the main pipe calibration hose 18 in the region of the opening 22. The lateral pipe calibration hose is closed in its second end region 28. In the embodiment shown in FIGS. 1 and 2, the lateral pipe calibration hose 20 projects from the main pipe calibration hose 18 at an angle of about 90°. Furthermore, a valve 30 having a pulling means connecting device 31 is arranged in the second end region 28 of the lateral pipe calibration hose 20.

As can be seen in particular from FIG. 3, the second end region 28 is closed by means of a cover 32, an aperture 34 in which the valve 30 is arranged being introduced into the cover 32. In order to fix the cover 32, the latter has at the edge a first inverted end region 36. Furthermore, the second end region 28 of the lateral pipe calibration hose 20 has a second inverted end region 37. The two inverted end regions 36, 37 are brought into contact with each other and connected in a material-locking manner and/or sewn to each other.

As emerges from FIG. 3, the valve 30 has a first end 38 projecting outwards and a second end 40 projecting into the interior of the lateral pipe calibration hose 20, and a central section 42. Both at the first end 38 and at the second end 40, a thread 44 is introduced in each case. Engaging in each of the threads 44 is a pulling means connecting device in the form of an annular nut 46, to which in each case a cord or a fibreglass rod, not specifically illustrated, can be fixed. The valve is formed as an outlet valve, in particular as a pressure relief valve.

Arranged between an outer side 48 of the cover and the valve 30 and between an inner side 50 of the cover and the valve 30 are a plurality of different layers. Here, in each case an annular fabric strip 52 surrounding the aperture 34 is connected in a material-locking manner to the outer side 48 of the cover and the inner side 50 of the cover in each case. In each case a metallic ring 54 surrounding the aperture 34 is placed on the fabric strip 52 and connected in a material-locking manner to the fabric strips 52. Between the valve 30 and the metallic rings 54, in each case a silicone ring 56 is introduced, the silicone rings 56 being connected in a material-locking manner to the metallic rings 54.

As can be seen in FIG. 4, in the lower region 34 of the main pipe calibration hose 18, two reinforcing elements in the form of two fabric strips are introduced. The reinforcing elements 60 protect the main pipe calibration hose 18 against any possible damage by rigid or movable parts of a packer.

In relation to the description of the further embodiments, the same reference symbols are used for identical or functionally identical parts.

In FIG. 5, a second embodiment of the calibration hose 10 is shown. Here, the lateral pipe calibration hose is connected to the main pipe calibration hose 18 via a detachable connecting device 24.

As emerges from FIGS. 5, 6 and 7, the detachable connecting device 24 has a first connecting unit 70, a second connecting unit 72 and a third connecting unit 74. The first connecting unit 70 is arranged in the first end region 26 of the lateral pipe calibration hose 20 and is connected in a material-locking manner and/or sewn to the lateral pipe calibration hose 20. The second connecting unit 72 surrounds the opening 22 in the main pipe calibration hose 18 and is fixed to the main pipe calibration hose 18. The third connecting unit 74 surrounds the second connecting unit 72 and is fixed to the main pipe calibration hose 18. Both connecting units 72, 74 are preferably connected in a material-locking manner and/or sewn to the main pipe calibration hose 18. In the present exemplary embodiment, the detachable connecting device 24 is a zip fastener. Furthermore, it is also conceivable, however, to use a hook-and-loop fastener as detachable connecting device 24. As can be seen in particular in FIG. 6, the second connecting unit 72 is surrounded by an inner first sealing lip 76 and an outer first sealing lip 78. The third connecting unit 74 is surrounded by an inner second sealing lip 80 and an outer second sealing lip 82. The sealing lips 76, 78, 80, 82 cover the connecting units 70, 72, 74 when the main pipe calibration hose 18 is connected to the lateral pipe calibration hose 20. As emerges in particular from FIG. 5, the second connecting unit 72 is used with a lateral pipe calibration hose 20 which projects from the main pipe calibration hose 18 at an angle of approximately 90°. The third connecting unit is used with a lateral pipe calibration hose 20 which projects from the main pipe calibration hose 10 at an angle of approximately 45°.

In addition, however, it is also conceivable to provide the main pipe calibration hose only with the second connecting unit 72 or the third connecting unit 74.

FIG. 8 shows a third embodiment of the calibration hose according to the invention. The third embodiment differs from the first embodiment in that the lateral pipe calibration hose 20 projects from the main pipe calibration hose 18 at an angle of approximately 45°. Here, the lateral pipe calibration hose 20 is connected via its first connecting unit 70 to the third connecting unit 74 of the main pipe calibration hose 20.

In FIGS. 9 to 14, a fourth embodiment of the calibration hose 10 is disclosed. The fourth embodiment differs from the preceding embodiments with regard to the detachable connecting device 24 and the connecting region 90.

As can be gathered in particular from FIG. 9, the detachable connecting device 24 has a connecting ring made of flexible plastic and a clamping ring 100 made of plastic. The connecting ring 94 comprises a first section 96 and a second section 98. As illustrated in FIG. 14, the second section 98 has a circumferential recess 102 and a circumferential latching lug 110, the latching lug 110 projecting radially outwards in such a way that it partly covers the recess 102 and thus produces a receiving opening 116, the diameter of which is smaller than the diameter of the recess 102.

Furthermore, in this embodiment, the connecting region is formed as a connector-type calibration hose 92, as can be gathered from FIGS. 9 to 11. The connector-type calibration hose 92 is adhesively bonded and/or sewn to the main pipe calibration hose 18 in the area of the opening 22 in the main pipe calibration hose 21. At its free end, the connector-type calibration hose 92 has a curved course 112, the diameter of the connector-type calibration hose 92 decreasing in order to form a connecting region 104 which is matched to the diameter of the connecting ring 94. The connecting ring 94 is sewn and/or adhesively bonded to the connecting region 104 via its first section 96.

The lateral pipe calibration hose 20 has a curved course 114 in its first end region 26, as illustrated in FIG. 12. At the free end of the first end region 26, the lateral pipe calibration hose 20 has a clamping region 106, which comprises a circumferential approximately semicircular indentation 118 to accommodate the clamping ring 100. The clamping region 106, in particular the indentation 118, is matched to the connecting ring 94 and in particular to the recess 102.

As FIG. 13 discloses, the clamping ring 100 has on its inner circumferential surface two circumferential chamfers 108, which make it easier to insert and remove the clamping ring 100 through the receiving opening 116. The clamping ring 100 is used to fix the first end region 26 of the lateral pipe calibration hose 20 detachably and with a force fit in the recess 102 in the connecting ring 94.

In the following text, the fixing of the lateral pipe calibration hose 20 to the connecting ring 94 will be explained. For this purpose, firstly the clamping ring 100 is inserted into the indentation 118. After that, the clamping region 106 of the lateral pipe calibration hose 20, together with the clamping ring 100, is pressed into the recess 102 through the receiving opening 116. Since the connecting ring 94 is fabricated from a flexible plastic and the clamping ring 100 is wider than the receiving opening 116, the latching lug 110 is forced aside as the clamping ring 100 is pressed in, so that the clamping ring 100 and the indentation 118 are introduced into the recess 102. After the clamping ring 100 and the indentation 118 have passed through the receiving opening 116, the latching lug 110 springs back into its initial position again and then rests on the clamping region 106. Here, the latching lug 102 fixes the first end region 26 of the lateral pipe calibration hose in the recess 102 with a force fit. The force-fitting connection can be released again by forcing the latching lug 102 aside and pulling the first end region 26 of the lateral pipe calibration hose 20 with the clamping ring 100 out of the recess 102.

In the following text, a possible method for rehabilitating the junction area 12 with the aid of the calibration hose 10 according to the invention will be described. To this end, the main pipe calibration hose 18 is pushed onto a packer, not illustrated, the main pipe calibration hose 18 in each case being fixed at the ends by means of clamping collars 64 to a cylindrical connecting element, not illustrated, of the packer, so that an airtight connection is produced, as illustrated in FIG. 1. A lining element 64 impregnated with resin, which has a main section 66 and a lateral section 68, is then pushed onto the calibration hose 10. When pushed on, the main section 66 surrounds the main pipe calibration hose 18, and the lateral section 68 is arranged in the area of the lateral pipe calibration hose 20 in such a way that the lateral pipe calibration hose 20 is able to extend through the lateral section 68 when inflated, as illustrated in FIG. 1. The calibration hose 10 is then inflated in order to check its tightness. After that, the air is let out of the calibration hose 10 and the lateral pipe calibration hose 20 is slipped into the interior of the main pipe calibration hose 18 by means of a cord, not illustrated, via the pulling means connecting device 31 projecting into the interior of the lateral pipe calibration hose 20 in the second end region 28. Following that, the packer is moved to the junction area 12 to be rehabilitated in such a way that the lateral pipe calibration hose 20 can be slipped into the house connecting pipe 16. Following the exact positioning, the calibration hose 10 is pressurized and, at the same time, the lateral pipe calibration hose 20 is slipped into the house connecting pipe 16 with the aid of a cord or fibreglass rod, not illustrated, fixed to the pulling means connecting device 31 projecting outwards. As a result of the pressurization of the calibration hose 10, the lining element 64 is forced against the junction area 12, the main pipe 14 and the house connecting pipe 16 and is cured. Following the curing of the lining element 64, the air is let out of the calibration hose. Furthermore, the lateral pipe calibration hose 20 is slipped into the main pipe calibration hose 18 with the aid of the cord. The packer is then removed from the main pipe 14.

The calibration hose 10 according to the invention is distinguished by the fact that a valve 30, which is used to control the pressure within the calibration hose 10, is arranged in its second end region 28. In the calibration hose 10 according to the invention, the valve 30 is advantageously an outlet valve, in particular a pressure relief valve, so that, in the event of an excessive pressure, air is let out of the calibration hose 10. In the event of an excessive pressure, once the pressure required to press on the lining element 64 is achieved again following the opening of the valve 30, the valve 30 closes again.

Consequently, a calibration hose 10 is created which makes it no longer necessary to check the maximum pressure. Furthermore, the valve 30 is distinguished by its reliability and by the low manufacturing costs.

| List of reference symbols | |
| --- | --- |
| 10 | Calibration hose |
| 12 | Junction area |
| 14 | Main pipe |
| 16 | House connecting pipe |
| 18 | Main pipe calibration hose |
| 20 | Lateral pipe calibration hose |
| 22 | Opening |
| 24 | Detachable connecting device |
| 26 | First end region |
| 28 | Second end region |
| 30 | Valve |
| 31 | Pulling means connecting device |
| 32 | Cover |
| 34 | Aperture |
| 36 | Fist inverted end region |
| 37 | Second inverted end region |
| 38 | First end |
| 40 | Second end |
| 42 | Central section |
| 44 | Thread |
| 46 | Annular nut |
| 48 | Outer side of the cover |
| 50 | Inner side of the cover |
| 52 | Fabric strip |
| 54 | Metallic ring |
| 56 | Silicone ring |
| 58 | Lower region |
| 60 | Reinforcing element |
| 62 | Clamping collars |
| 64 | Lining element |
| 66 | Main section |
| 68 | Lateral section |
| 70 | First connecting unit |
| 72 | Second connecting unit |
| 74 | Third connecting unit |
| 76 | Inner first sealing lip |
| 78 | Outer first sealing lip |
| 80 | Inner second sealing lip |
| 82 | Outer second sealing lip |
| 90 | Connecting region |
| 92 | Connector-type calibration hose |
| 94 | Connecting ring |
| 96 | First section |
| 98 | Second section |
| 100 | Clamping ring |
| 102 | Recess |
| 104 | Connecting region |
| 106 | Clamping region |
| 108 | Chamfer |
| 110 | Latching lug |

-continued

| List of reference symbols | |
|---|---|
| 112 | Curved course of the connector-type calibration hose |
| 114 | Curved course of the lateral pipe calibration hose |
| 116 | Receiving opening |
| 118 | Indentation |

The invention claimed is:

1. A calibration hose for use in a device for rehabilitating pipelines, having a main pipe calibration hose and a lateral pipe calibration hose, the main pipe calibration hose having a connecting region, the lateral pipe calibration hose being connected in its first end region to the connecting region of the main pipe calibration hose, and the lateral pipe calibration hose being closed in its second end region, and wherein a valve is provided in the second end region.

2. The calibration hose according to claim 1, wherein the valve a pressure relief valve.

3. The calibration hose according to claim 1, wherein at least one pulling means connecting device is fitted to the valve.

4. The calibration hose according to claim 3, wherein a first end of the valve and a second end of the valve are each provided with a pulling means connecting device.

5. The calibration hose according to claim 4, wherein the first end of the valve and/or the second end of the valve are each provided with a thread, and at least one of the threads engages with an annular nut as a pulling means connecting device.

6. The calibration hose according to claim 1, wherein the second end region is closed by a cover, the cover being connected to the second end region of the lateral pipe calibration hose in a material-locking manner and/or by sewing, an aperture being introduced into the cover, into which the valve is inserted.

7. The calibration hose according to claim 6, at least one fabric rings, is arranged between the valve and an outer side of the cover and/or between the valve and an inner side of the cover in each case.

8. The calibration hose according to claim 7, wherein at least one silicone ring is arranged between at least one of the fabric strips and the valve.

9. The calibration hose according to claim 8, wherein at least one metallic ring is arranged between the fabric strip and the silicone ring.

10. The calibration hose according to claim 1, wherein the lateral pipe calibration hose is connected to the connecting region via a detachable connecting device.

11. The calibration hose according to claim 10, wherein the detachable connecting device comprises a zip fastener or a hook-and-loop fastener.

12. The calibration hose according to claim 10, characterized in that wherein the detachable connecting device comprises a connecting ring connected to the connecting region and a clamping ring, the first end region of the lateral pipe calibration hose being fixed in a force-fitting manner in a recess in the connecting ring by means of the clamping ring.

13. The calibration hose according to claim 1, wherein the main pipe calibration hose and/or the lateral pipe calibration hose comprises at least one reinforcing element, in particular a fabric strip.

14. The calibration hose according to claim 1, wherein the main pipe calibration hose and/or the lateral pipe calibration hose comprises a fabric layer and at least one plastic coating.

15. The calibration hose according to claim 11, characterized in that wherein the detachable connecting device comprises a connecting ring connected to the connecting region and a clamping ring, the first end region of the lateral pipe calibration hose being fixed in a force-fitting manner in a recess in the connecting ring by means of the clamping ring.

16. The calibration hose according to claim 2, characterized in that wherein at least one pulling means connecting device is fitted to the valve.

17. A calibration hose for use in a device for rehabilitating pipelines, having a main pipe calibration hose and a lateral pipe calibration hose, the main pipe calibration hose having a connecting region, the lateral pipe calibration hose being connected in its first end region to the connecting region of the main pipe calibration hose, and the lateral pipe calibration hose being closed in its second end region, and wherein a valve is provided in the second end region;
  wherein at least one pulling means connecting device is fitted to the valve;
  wherein a first end of the valve and a second end of the valve are each provided with a pulling means connecting device; and
  wherein the first end of the valve and/or the second end of the valve are each provided with a thread, and at least one of the threads engages with an annular nut as a pulling means connecting device.

18. A calibration hose for use in a device for rehabilitating pipelines, having a main pipe calibration hose and a lateral pipe calibration hose, the main pipe calibration hose having a connecting region, the lateral pipe calibration hose being connected in its first end region to the connecting region of the main pipe calibration hose, and the lateral pipe calibration hose being closed in its second end region, and wherein a valve is provided in the second end region;
  wherein the second end region is closed by a cover, the cover being connected to the second end region of the lateral pipe calibration hose in a material-locking manner and/or by sewing, an aperture being introduced into the cover, into which the valve is inserted.

19. The calibration hose according to claim 18, at least one fabric rings, is arranged between the valve and an outer side of the cover and/or between the valve and an inner side of the cover in each case.

20. The calibration hose according to claim 19, wherein at least one silicone ring is arranged between at least one of the fabric strips and the valve.

21. The calibration hose according to claim 20, wherein at least one metallic ring is arranged between the fabric strip and the silicone ring.

22. A calibration hose for use in a device for rehabilitating pipelines, having a main pipe calibration hose and a lateral pipe calibration hose, the main pipe calibration hose having a connecting region, the lateral pipe calibration hose being connected in its first end region to the connecting region of the main pipe calibration hose, and the lateral pipe calibration hose being closed in its second end region, and wherein a valve is provided in the second end region;
  wherein the lateral pipe calibration hose is connected to the connecting region via a detachable connecting device; and
  characterized in that wherein the detachable connecting device comprises a connecting ring connected to the connecting region and a clamping ring, the first end region of the lateral pipe calibration hose being fixed in a force-fitting manner in a recess in the connecting ring by means of the clamping ring.

23. A calibration hose for use in a device for rehabilitating pipelines, having a main pipe calibration hose and a lateral pipe calibration hose, the main pipe calibration hose having a connecting region, the lateral pipe calibration hose being connected in its first end region to the connecting region of the main pipe calibration hose, and the lateral pipe calibration hose being closed in its second end region, and wherein a valve is provided in the second end region; and wherein the main pipe calibration hose and/or the lateral pipe calibration hose comprises at least one reinforcing element, in particular a fabric strip.

24. A calibration hose for use in a device for rehabilitating pipelines, having a main pipe calibration hose and a lateral pipe calibration hose, the main pipe calibration hose having a connecting region, the lateral pipe calibration hose being connected in its first end region to the connecting region of the main pipe calibration hose, and the lateral pipe calibration hose being closed in its second end region, and wherein a valve is provided in the second end region;

wherein the lateral pipe calibration hose is connected to the connecting region via a detachable connecting device;

wherein the detachable connecting device comprises a zip fastener or a hook-and-loop fastener; and characterized in that wherein the detachable connecting device comprises a connecting ring connected to the connecting region and a clamping ring, the first end region of the lateral pipe calibration hose being fixed in a force-fitting manner in a recess in the connecting ring by means of the clamping ring.

\* \* \* \* \*